US008866776B2

(12) United States Patent
Yamanaka et al.

(10) Patent No.: US 8,866,776 B2
(45) Date of Patent: Oct. 21, 2014

(54) INFORMATION PROCESSING DEVICE ADAPTED TO RECEIVING AN INPUT FOR USER CONTROL USING A TOUCH PAD AND INFORMATION PROCESSING METHOD THEREOF (75) Inventors: Yasuhiro Yamanaka, Chiba (JP); Takashi Hatakeda, Tokyo (JP); Fumitake Yodo, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 142 days.

(21) Appl. No.: 13/590,264

(22) Filed: Aug. 21, 2012

(65) Prior Publication Data

US 2013/0057487 A1    Mar. 7, 2013

(30) Foreign Application Priority Data

Sep. 1, 2011  (JP) .................................. 2011-191130

(51) Int. Cl.
*G06F 3/041* (2006.01)
*G06F 1/16* (2006.01)
*G06F 3/0488* (2013.01)

(52) U.S. Cl.
CPC ............ *G06F 3/0416* (2013.01); *G06F 1/1626* (2013.01); *G06F 1/169* (2013.01); *G06F 3/04883* (2013.01); *G06F 1/1643* (2013.01)

USPC .......................................... 345/173; 345/684

(58) Field of Classification Search
CPC ...... G06F 3/041; G06F 3/0416; G06F 3/0485; G06F 3/0488
USPC ............... 345/173, 174, 157, 684; 178/18.01, 178/18.03; 715/830, 856
See application file for complete search history.

(56) References Cited

U.S. PATENT DOCUMENTS

| 2011/0080359 | A1* | 4/2011 | Jang et al. ...................... 345/173 |
| 2011/0187660 | A1* | 8/2011 | Hirata et al. ................... 345/173 |
| 2012/0098769 | A1* | 4/2012 | Nagasaka ....................... 345/173 |
| 2012/0256856 | A1* | 10/2012 | Suzuki et al. ................. 345/173 |

* cited by examiner

*Primary Examiner* — Regina Liang
(74) *Attorney, Agent, or Firm* — Katten Muchin Rosenman LLP

(57) ABSTRACT

A device with a display is provided with a first touch pad on the front face of the device and a second touch pad on the rear face. When an operation is performed only on the first touch pad, the process allocated to the point of contact or the pattern of movement thereof is identified and executed. When both the first and second touch pads are used for operation, the process defined to correspond to a combination of modes of movement of the points of contact is identified and executed. When an operation is performed only on the second touch pad, only the component of the movement of the point of contact in a limited direction is extracted to calculate the amount of scrolling, and a scroll process is performed accordingly.

8 Claims, 7 Drawing Sheets

INFORMATION PROCESSING DEVICE ADAPTED TO RECEIVING AN INPUT FOR USER CONTROL USING A TOUCH PAD AND INFORMATION PROCESSING METHOD THEREOF

BACKGROUND OF THE INVENTION

1. Field of the Invention

The present invention relates to an information processing device and an information processing method adapted to receive a manual input for user control and process information accordingly.

2. Description of the Related Art

Recently, small-sized information devices that are portably designed, including portable game devices, cell phones, and personal digital assistants (PDAs), have become popular. Due to size constraints, the variety of input means for such small-sized devices is limited. As a result, unique input means and functions specifically designed for small-sized devices have been developed. For example, by covering a display surface with a touch pad and allowing a finger or a touch pen to provide an input, the user can feel as if he or she is directly controlling an object displayed on the display.

There is consistent demand to perform information processing irrespective of device size or use environment, i.e., to perform information processing conventionally performed using a personal computer or a desktop game device. Attempts to perform equally advanced information processing using a small-sized device have met the problem of poorer operability caused by constraints on input means as described above.

SUMMARY OF THE INVENTION

The present invention addresses the problem and a purpose thereof is to provide a technology capable of implementing an input means of high operability in the presence of size constraints.

One embodiment of the present invention relates to an information processing device. The information processing device is provided with a display on a front face of a main device body, and comprises: a rear face touch pad provided on a rear face of the main device body and configured to detect a position of contact by a user as a point of contact; a control information conversion unit configured to convert information indicating the point of contact detected on the rear face touch pad into information indicating a process that should be performed, in accordance with a predefined conversion rule; and an information processing unit configured to execute the process that should be performed and to update a display screen on the display, wherein, when the point of contact is moved while contact is maintained, the control information conversion unit calculates a directional component of the amount of movement along a predefined direction of an axis and converts the information whereby the display screen is scrolled only in a predetermined direction of the axis by the amount of movement corresponding to the calculated directional component.

Another embodiment of the present invention relates to an information processing method. The information processing method is configured to cause an information processing device provided with a display on a front face of a main device body to perform the steps of: detecting a position of contact by a user with a rear face touch pad provided on a rear face of the main device body, as a point of contact; converting information indicating the detected point of contact into information indicating a process that should be performed, in accordance with a predefined conversion rule; and executing the process that should be performed and updating a display screen on the display, wherein, when the point of contact is moved while contact is maintained, the step of converting also includes calculating a directional component of the amount of movement along a predefined direction of an axis and converting the information whereby the display screen is scrolled only in a predetermined direction of the axis by the amount of movement corresponding to the calculated directional component.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
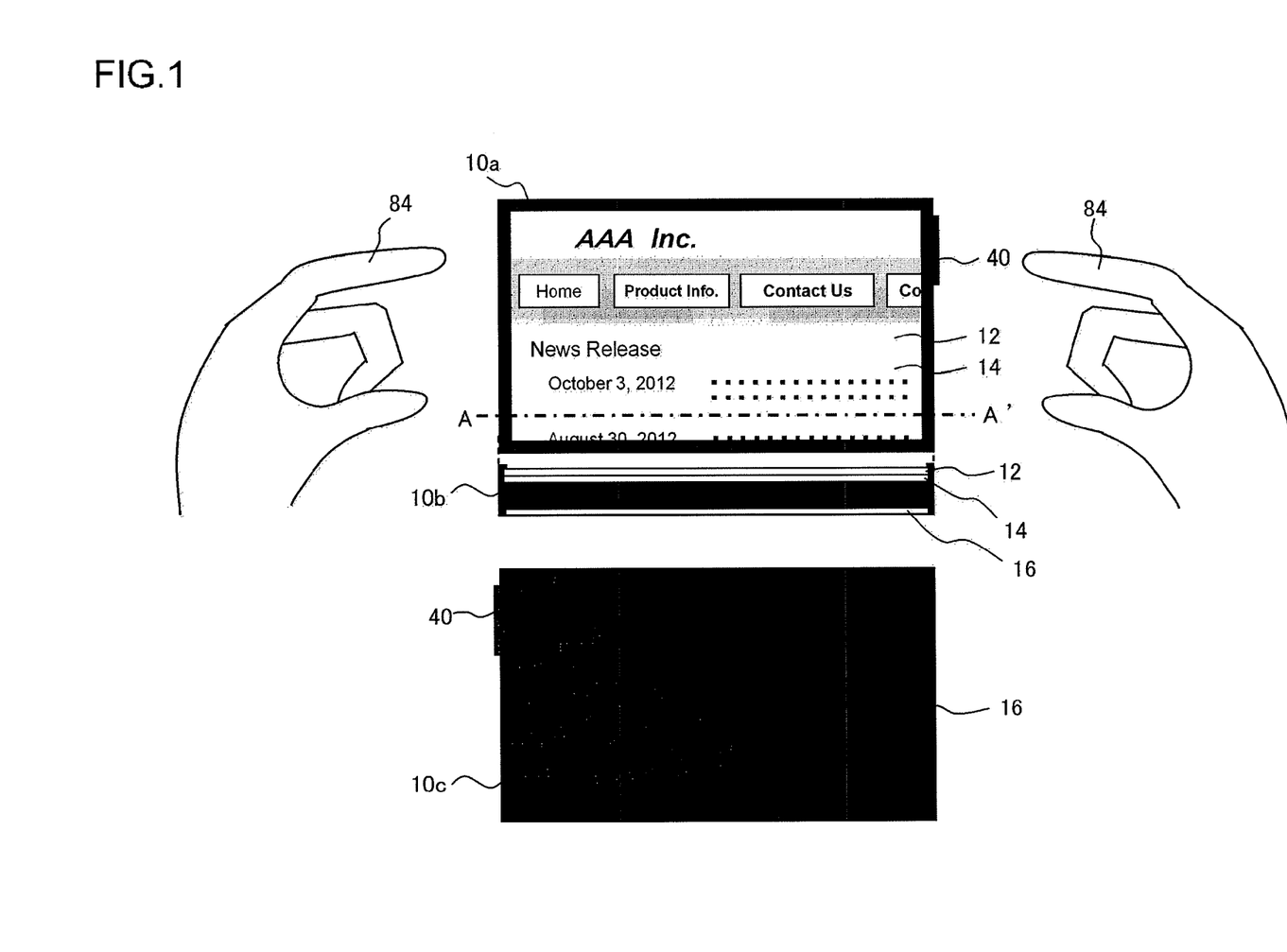
FIG. 1 shows an exemplary appearance of an information processing device according to the embodiment.

FIG. 1 shows an exemplary appearance of an information processing device according to the embodiment. Referring to FIG. 1, the top of the figure shows a front face 10*a* and the bottom of the figure shows a rear face 10*c*. A section 10*b* of the front face 10*a* along the line A-A' in the illustration is shown in the middle. The device with the illustrated appearance will be referred to hereinafter as an information processing device 10. However, the appearance of the information processing device 10 is non-limiting.

The information processing device 10 is of a size that can be carried by a user and may be a cell phone, PDA, a portable game device, etc. The information processing device 10 may have combined functions of these devices. For this purpose, the information processing device 10 may be provided with various processing hardware depending on the required functions. The description of such hardware will be omitted as appropriate because it can be implemented by using a standard technology.

The front face 10a of the information processing device 10 primarily comprises a display 14. A start switch 40 is provided on the side of the information processing device 10. Hardware necessary for information processing such as a CPU, a graphics processor unit, a sound processor, a memory, etc. is installed inside the information processing device 10 (not shown). The information processing device 10 may additionally comprise a speaker for outputting sound, an earphone connection terminal, a microphone, a camera, an infrared port or a wireless LAN hardware for communication with other devices, a battery box, etc. (not shown).

The display 14 may be a standard display such as a liquid crystal display, an electronic luminescence (EL) display, a plasma display, etc. The top surface of the display 14 is covered by a first touch pad 12 covered by glass or a transparent resin having high transmissivity. The rear face 10c of the information processing device 10 comprises a second touch pad 16 covered with the same type of resin as that of the housing. The first and second touch pads 12 and 16 may be implemented by a practically used means such as an electrical resistance film, an optical sensor, or a capacitive coupling assembly.

The display 14 shows a menu screen, a screen necessary to provide an input for user control such as arrangement of icons, or a screen that should be output to show a result of executing an input for user control such as a web browser screen, a display screen showing various content such as an electronic book, newspaper, a map, a still image, moving images, and a game screen, and a screen for a creating a document or a table, depending on the required functions. Further, a graphical user interface to let the user viewing the screen provide an input for user control may be displayed on the screen.

As shown in FIG. 1, the user touches the first and second touch pads 12 and 16 while holding the main device body of the information processing device 10 with his or her hands 84. FIG. 1 shows the information processing device 10 and the hands 84 distanced from each other to show them plainly. When the information processing device 10 is actually held, the thumb and the index finger will rest on the front face 10a and the other fingers will rest beneath the rear face 10c. In this case, an input for user control is provided by mainly using the thumb and the index finger to touch the first touch pad 12 exposed on the front face 10a of the information processing device, and using the middle finger to touch the second touch pad 16 exposed on the rear face 10c. The fingers actually used to touch the pads are non-limiting but the following description assumes that the touch pads are touched as described above.

The appearance of the information processing device 10 shown in FIG. 1 is by way of example only. Control means other than the first and second touch pads 12 and 16 may be provided. For example, buttons assigned the functions of providing various inputs for user control may be provided on the front face 10c of the information processing device. Alternatively, a camera or a microphone provided on at least one of the front face 10a and the rear face 10c may be used as a control means.

Figure 2:
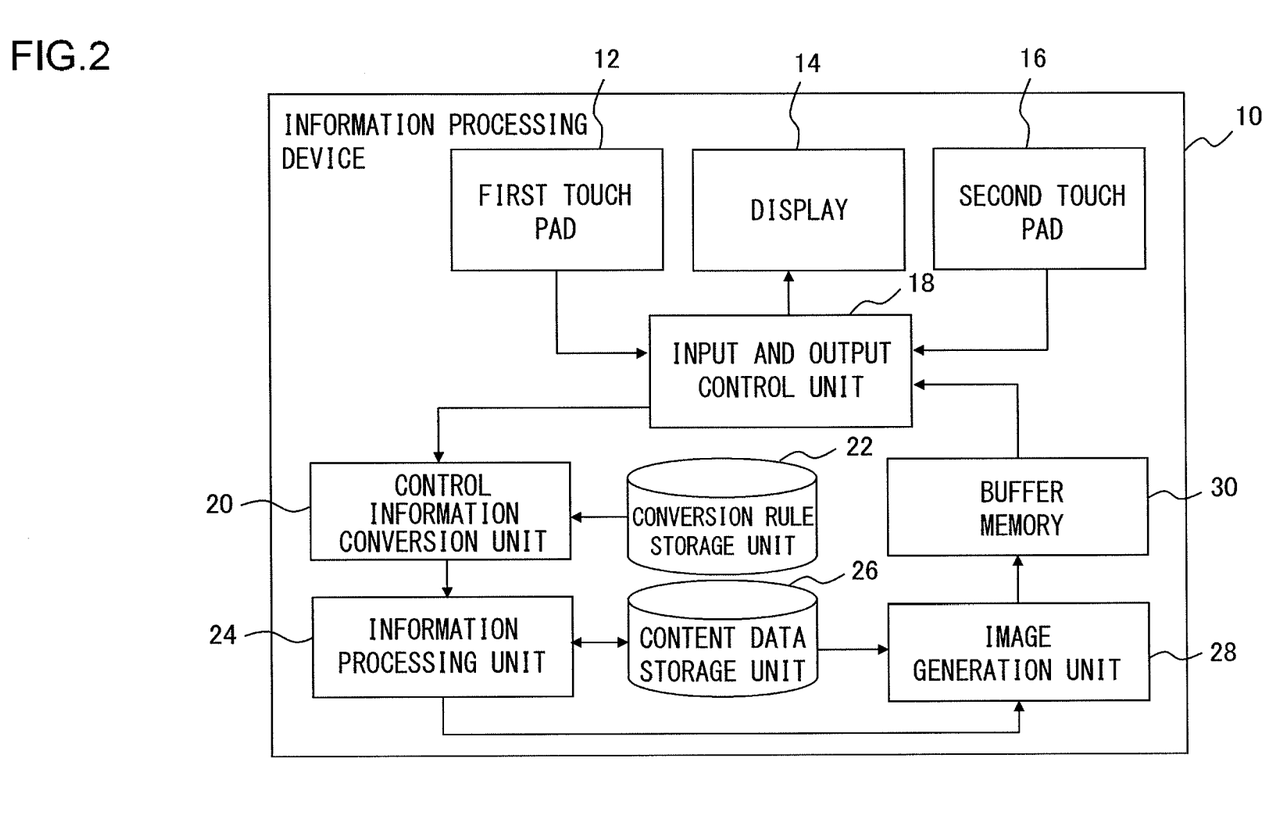
FIG. 2 shows the configuration of the information processing device in detail.

FIG. 2 shows the configuration of the information processing device 10 in detail. In addition to the first touch pad 12, the display 14, and the second touch pad 16 described above, the information processing device 10 includes an input and output control unit 18 for receiving an input signal from the first and second touch pads 12 and 16 and controlling output of image data to the display 14, a control information conversion unit 20 for converting the input signal from the first and second touch pads 12 and 16 to information indicating the process that should be performed, an information processing unit 24 for performing information processing according to the process that should be performed, an image generation unit 28 for generating an image that should be output, and a buffer memory 30 for storing the generated image temporarily.

The information processing device 10 further includes a conversion rule storage unit 22 for storing rules whereby the control information conversion unit 20 converts the input signal from the first and second touch pads 12 and 16 to the process that should be performed, and a content data storage unit 26 for storing data used by the information processing unit 24 for information processing or a file created by the user.

The elements depicted in FIG. 2 as functional blocks for performing various processes are implemented by hardware such as a CPU, a main memory, or other LSI's, and by software such as a program etc., for arithmetic processing, establishment of communication over a network, and image processing. Therefore, it will be obvious to those skilled in the art that the functional blocks may be implemented in a variety of manners by hardware only, software only, or a combination of thereof.

The input and output control unit 18 is connected to the first touch pad 12, the display 14, and the second touch pad 16 according to a known method and controls input and output of signals. The input signal received from the first and second touch pads 12 and 16 indicates the coordinates of a point of contact on the touch pad touched by the user, a path of movement of the coordinates occurring as the point of contact moves continuously, etc. The method of detecting the point of contact on the touch pads differs depending on the system employed so that a description thereof is omitted. The input and output control unit 18 also reads image data from the buffer memory 30 and provides timed output of the data to the display 14.

Further, the input and output control unit 18 may acquire data necessary to display a web page or content from an external device such as a server connected via a network, in accordance with a predetermined communication protocol, and may supply the acquired data to the information processing unit 24, the image generation unit 28, etc. Such a process can be implemented by a standard technology and the illustration thereof is omitted.

The control information conversion unit 20 acquires the input signal from the first and second touch pads 12 and 16 via the input and output control unit 18 and converts the coordinates of the point of contact, etc., included in the signal into the information indicating the process that should be performed. In this process, the control information conversion unit 20 identifies a conversion rule adapted to the actual input signal by referring to the conversion rules stored in the conversion rule storage unit 22, and converts the signal into the process that should be performed in accordance with the identified rule.

For example, where an array of icons is displayed on the display 14, a conversion rule mapping an area in which an icon is displayed to a process that should be performed when the icon is selected may be stored in the conversion rule storage unit 22. When the coordinates of the point of contact on the first touch pad 12 is received as the input signal, the control information conversion unit 20 determines whether the point of contact is located outside or inside the area in which the icon is displayed. When the point of contact is inside the icon area, the control information conversion unit 20 learns that the icon is selected. The control information conversion unit 20 identifies the process mapped to the icon.

The above-described process is performed in general in an information processing device in which a touch pad on a display is used as an input means. Various other conversion rules may be defined depending on the content of a screen displayed on the display 14 or the function implemented by the information processing device 10 and stored in the conversion rule storage unit 22. In further accordance with the embodiment, a conversion rule that allows for operability is defined for the operation using the second touch pad 16 provided on the rear face. A specific example will be described later.

The information processing unit 24 performs information processing depending on the functions (e.g., a web browser, display of content, a game, document creation) that should be implemented in the information processing device 10, by controlling the functional blocks in the information processing device 10. In this process, the information processing unit 24 learns the process that should be performed according to the user operation of the touch pad, from the control information conversion unit 20.

A program, image data, audio data, text data, etc. necessary for processing in the information processing unit 24 are stored in the content data storage unit 26. The information processing unit 24 stores electronic data for a document or table created by the user in the content data storage unit 26 as appropriate. The information processing unit 24 further requests the image generation unit 28 to generate an image that should be displayed on the display 14 to show the result of processing.

The image generation unit 28 performs image processing in accordance with a request from the information processing unit 24, generates data for an image that should be output, and stores the data in the buffer memory 30. As a result of the image data stored in buffer memory 30 being output to the display 14 under the control of the input and output control unit 18, the image determined by an input for user control is displayed on the display 14. The processes performed by the information processing unit 24 and the image generation unit 28 depend on the functions implemented by the information processing device 10 and are non-limiting. Standard technologies in practical use can be used to perform the processes so that a detailed description will be omitted.

The conversion rule storage unit 22 and the content data storage unit 26 are shown as individual storage means in FIG. 2. In practice, however, the data stored in the storage units may be collectively stored in a removable storage medium such as a memory card or an internal storage device in the form of application software. Still alternatively, a conversion rule stored in the conversion rule storage unit 22 and a program implementing a part of the associated conversion process may be stored in a storage device (not shown) in the form of a library provided by the operating system (OS) so that the conversion process is performed by calling the program while the application program is being executed.

A description will now be given of a method of effectively using the second touch pad 16 provided on the rear face 10c of the information processing device 10 having the above-described configuration, as an input means for a user control. The first touch pad 12 provided on the front face 10a of the information processing device is designed on an assumption that the display 14 beneath the pad, and the thumb and the index finger controlling the pad are located within the field of view of the user. Therefore, the first touch pad 12 is very useful to let the user viewing the content of a screen displayed on the display 14 feel as if the user is directly controlling the button or the document displayed as an image and provide an input for user control accordingly.

Meanwhile, the second touch pad 16 provided on the rear face 10c and the middle finger controlling the pad are behind the main device body of the information processing device 10 and cannot be seen from the user. Therefore, delicate user control such as distinguishing between different points of contact is not easy. However, the finger does not block the view of a screen while an input for user control is provided so that the user does not easily lose sight of small characters and graphics on display even if an extensive range on the second touch pad 16 is touched for operation. Accordingly, the second touch pad 16 is used to scroll the display screen in this embodiment.

Figure 3:
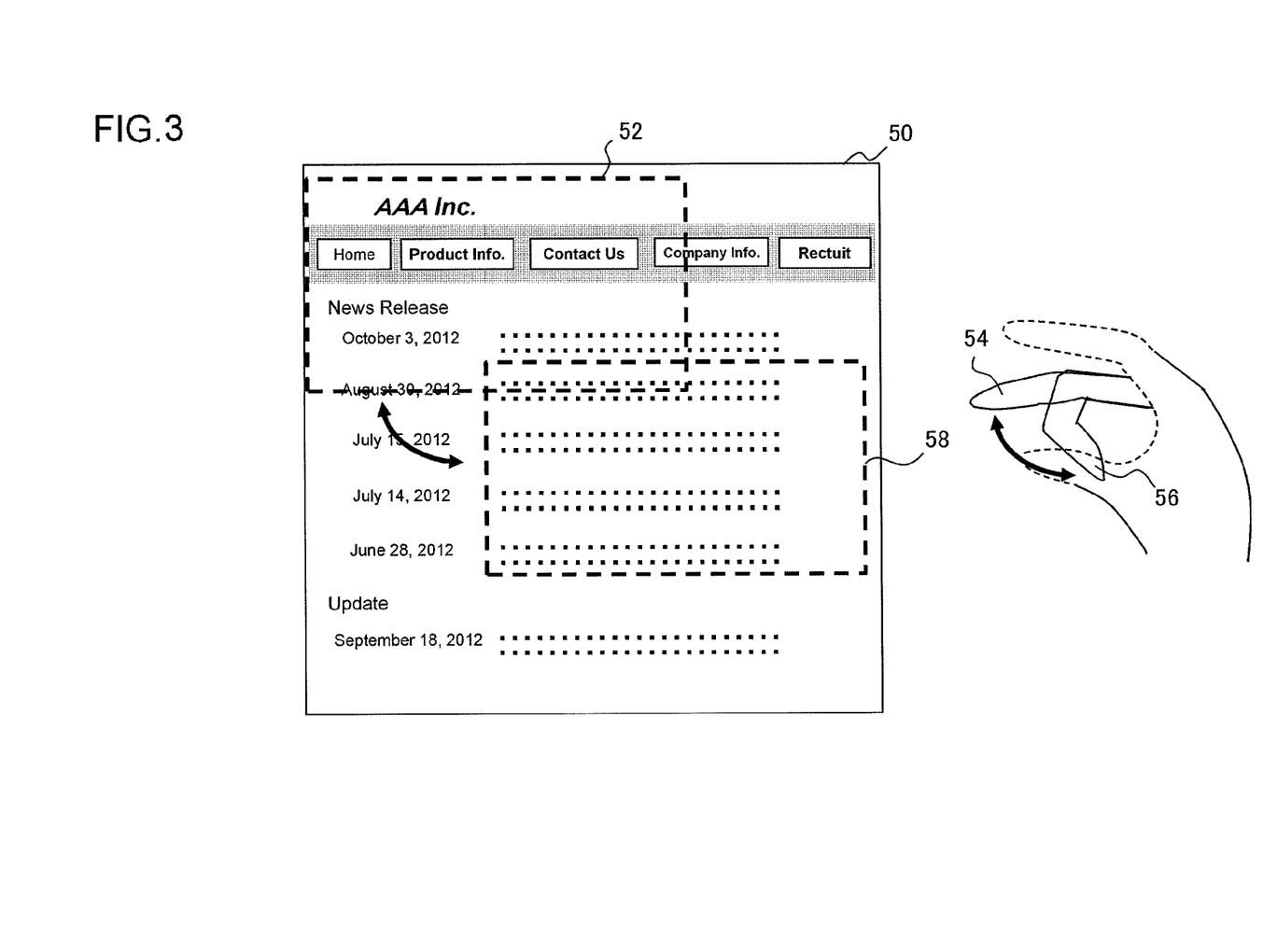
FIG. 3 shows the movement of the middle finger and the movement of the display screen occurring when the second touch pad is used to scroll the display screen.

FIG. 3 shows the movement of the middle finger and the movement of the display screen occurring when the second touch pad 16 is used to scroll the display screen. In the illustrated example, the user is browsing a web page 50 of a company called "AAA Inc.". It is assumed that an area 52 in the web page 50 is displayed in the first state. The displayed screen corresponds to the screen shown on the display 14 in FIG. 1.

The user scrolling the display screen using a touch pad can feel intuitive and natural movement when the display screen is scrolled in a direction in which, for example, a web page as virtual paper is fed by the movement of the finger. In other words, given that the web page remains stationary, the display area is basically moved in a direction opposite to the movement of the point of contact by the finger on a horizontal plane of the image.

It will be assumed by way of example that user wants to move the display area downward from the area 52 in the first state. In this case, it is necessary to feed the virtual paper showing the web page 50 upward. Therefore, the user tries to move the point of contact by the middle finger upward. In a natural movement, the top and second joints of the middle finger are bent so that the middle finger faces downward (state 56) and then the direction pointed by the finger is changed by unbending the joints gradually (state 54).

In this movement, however, the end of the middle finger moves on the second touch pad 16 as if to draw an arc. If the coordinates of the point of contact in this movement are directly imported and reflected in the movement of the display area, an arc-like movement from the area 52 in the first state to the area 58 in the second state results. The degree of bending of the joint easily changes the path of the point of contact irrespective of the intension of the user. Therefore, reproducibility and controllability of the direction of movement of the display area is hard to obtain.

In the case of a document screen as shown in the figure, vertical axis movement or, depending on the document format, horizontal axis movement is more preferred than diagonal movement. However, movement of the end of the middle finger in such a manner is far from natural. By converting the middle finger operation on the second touch pad 16 into a scroll operation limited in direction, a scroll operation on the rear face of the information processing device is enabled without requiring unnatural movement.

Figure 4:
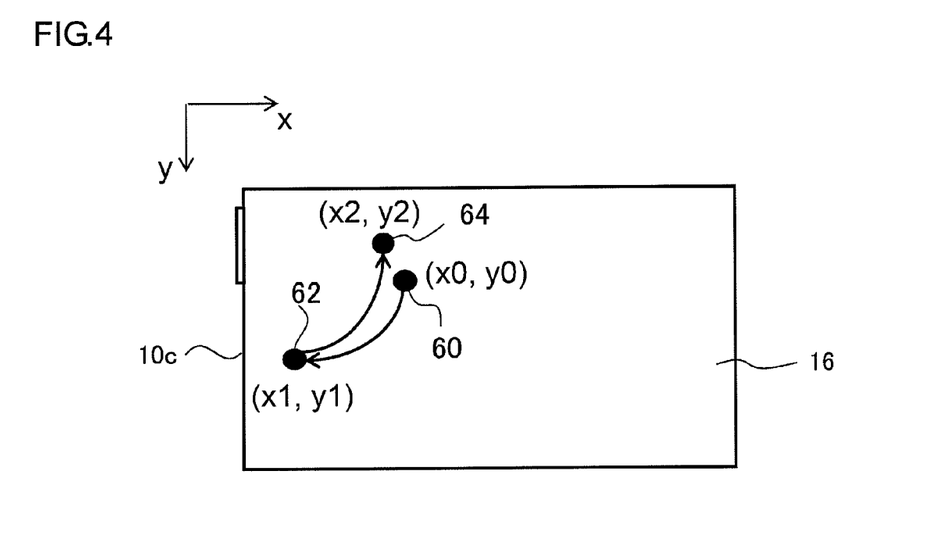
FIG. 4 shows a process of converting the movement of a point of contact into a scroll operation.

FIG. 4 shows a process of converting the movement of a point of contact into a scroll operation. The figure shows the rear face 10c of the information processing device 10 covered by the second touch pad 16 and schematically shows the movement of the point of contact by the right middle finger of the user. As illustrated, the horizontal direction of the second touch pad 16 is defined as the x axis and the vertical direction as the y axis.

It will be assumed that the user moves the point of contact, with the first point of contact 60 as a starting point and the second point of contact 62 as an ending point, and then moves the point of contact, with the second point of contact 62 as a starting point and the third point of contact 64 as an ending point. In an individual operation of moving the point of contact, contact is maintained. Meanwhile, the operation in which the second point of contact 62 is an ending point and the operation in which the second point of contact 62 is a starting point may not be continuous.

Assuming that the coordinates of the first point of contact 60, the second point of contact 62, and the third point of contact 64 are (x0, y0), (x1, y1), and (x2, y2), respectively, as illustrated in the figure, horizontal axis movement of the display area is not created and only vertical axis movement of the point of contact, i.e., the movement from y0 to y1 and from y1 to y2, is reflected in the movement of the display area, if the scroll is allowed only in the vertical axis (y axis) direction. In practice, the values of y coordinates during the operation are acquired at predetermined intervals so that the amount of movement of the display area is successively calculated. For conversion from the y-coordinate component in the coordinate system of the second touch pad 16 into the vertical axis coordinate component in the coordinate system of the image plane, different conversion formulas are defined depending on the content of the displayed image, the range in which the finger can move, the width permitted for the vertical axis movement of the display area, etc.

This causes the display screen to be scrolled only in the vertical axis direction even if the point of contact moves to draw an arc. Therefore, the display area is prevented from moving in a diagonal direction contrary to the intension of the user. In this case, it is ensured that scrolling in a diagonal axis direction or the horizontal axis direction can be effected as needed by a thumb or index finger operation on the first touch pad 12 provided on the front face 10*a* of the information processing device. For example, the first touch pad 12 may be adapted for scrolling in all directions by directly reflecting the movement of the point of contact in the screen scroll, and the second touch pad 16 may be adapted for scrolling only in a limited direction as described above.

With this, the user can use a front face operation or a rear face operation depending on the situation. For example, the user may use the second touch pad 16 on the rear face to effect rough movement and use the first touch pad 12 for precise positioning. By accepting an operation to enlarge or reduce a display screen using the first touch pad 12 and combining it with the scroll operation using the second touch pad 16, the display screen can be moved to a desired area in the image being displayed.

For example, given that an article in a web page being displayed is in a column layout, the magnification factor may be adjusted so that a single column is fitted precisely in the display screen by using the first touch pad 12, and the display screen may be scrolled only in the direction down the column by using the second touch pad 16. In this way, the user can continue reading an article without being distracted from the column in focus or can easily arrive at a desired article. Enlargement or reduction using the first touch pad 12 may be effected by causing two fingers such as the thumb and the index finger to touch the touch pad simultaneously and moving the fingers so as to extend or reduce the gap between points of contact.

When the touch pads are configured to be independently controlled as in this embodiment, a rule is defined to ensure, for example, that the front face operation is prioritized over the rear face operation. This prevents a mistaken operation, which may occur when, for example, the user inadvertently moves the middle finger in touch with the second touch pad 16 on the rear face while performing a front face operation.

The above description assumes that the movement is limited to the vertical axis direction. Similarly, in the case of limiting the movement to the horizontal direction, only the movement of the point of contact in the horizontal axis direction, i.e. only the movement from x0 to x1 and x1 to x2 is reflected in the movement of the display area. Whether to limit the direction of scrolling using the second touch pad 16 to the vertical axis direction or the horizontal axis direction is defined individually depending on the content of image, the required function, etc. The rule defined in this way is stored in the conversion rule storage unit 22 as a conversion rule. The control information conversion unit 20 extracts only the vertical axis direction component or the horizontal axis direction component of the point of contact in accordance with the defined conversion rule, calculates the amount of movement of the display area, and communicates the calculated amount to the information processing unit 24.

The direction to which scrolling is limited may be user defined. For example, a switch to select the vertical axis direction or the horizontal axis direction may be provided on the front face 10*a* of the information processing device, or a GUI for switching may be included in an image displayed on the display 14. Naturally, the thumb or the index finger resting on the front face 10*a* of the information processing device is used for a switching operation in this case. Alternatively, the direction of scrolling may be switched according to the initial direction of a scroll operation initiated by the middle finger touching the second touch pad 16.

Figure 5:
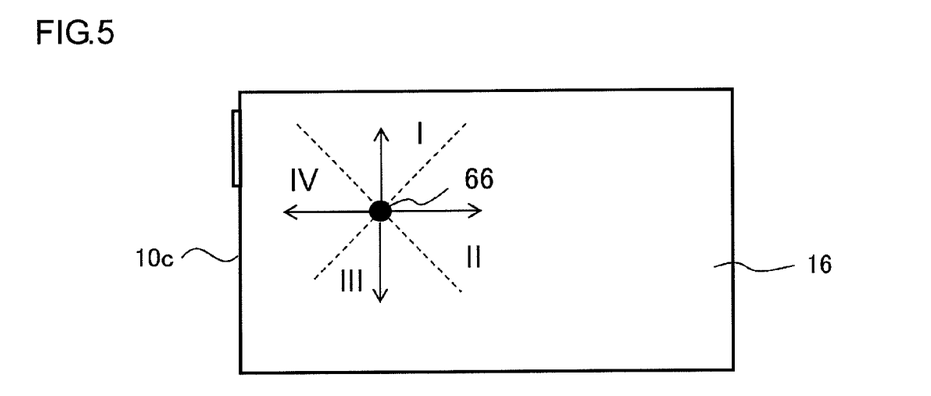
FIG. 5 shows a process of determining the direction of scrolling according to the initial direction of a scroll operation.

FIG. 5 shows a process of determining the direction of scrolling according to the initial direction of a scroll operation. Like FIG. 4, FIG. 5 shows the rear face 10*c* of the information processing device covered by the second touch pad 16. When the middle finger previously distanced from the second touch pad 16 touches a point of contact 66 to initiate a scroll operation, starting at the point 66, the axis of scrolling is determined to be vertical or horizontal depending on the direction of movement occurring immediately after the movement from the starting point is started. The term "direction of movement occurring immediately after the movement is started" may be the direction of a vector of movement from the starting point to the point of contact occurring after a small predetermined time interval.

More specifically, the plane is divided in the clockwise direction around the point of contact 66 newly touched by the finger into the first quadrant between −45° and 45°, the second quadrant between 45° and 135°, the third quadrant between 135° and 225°, and the fourth quadrant between 225° and 315° in the stated order. If the direction of movement from the point of contact 66 is located in the first or third quadrant, scrolling is limited to the vertical axis direction. If the direction of movement is located in the second or fourth quadrant, scrolling is limited to the horizontal axis direction. With a small initial movement, it is easy to target any of the four quadrants purposefully even if the operation is initiated by the middle finger resting on the rear face.

After limiting the direction of scrolling with the initial movement, the user can initiate screen scrolling limited to the axis direction that reflects the initial movement, by maintaining the contact and scrolling the display screen in a large scale movement as described above. Depending on the content of the image or the function to be achieved, scrolling may not only be limited to the vertical axis direction or the horizontal axis direction but also to a diagonal axis direction at a predetermined angle. In this case, the coordinates of the point of contact in movement may be subject to coordinate conversion within the same coordinate system by determining the orthogonal projection to a target axis that passes through the point of contact, which is the starting point of the movement. Further, the amount of movement of the display area may be determined by converting the resultant coordinates into those in the coordinate system of the image. In this case, the direction of axis of scrolling may be switched as desired according to the direction of initial movement by increasing the number of quadrants shown in FIG. 5.

Figure 6:
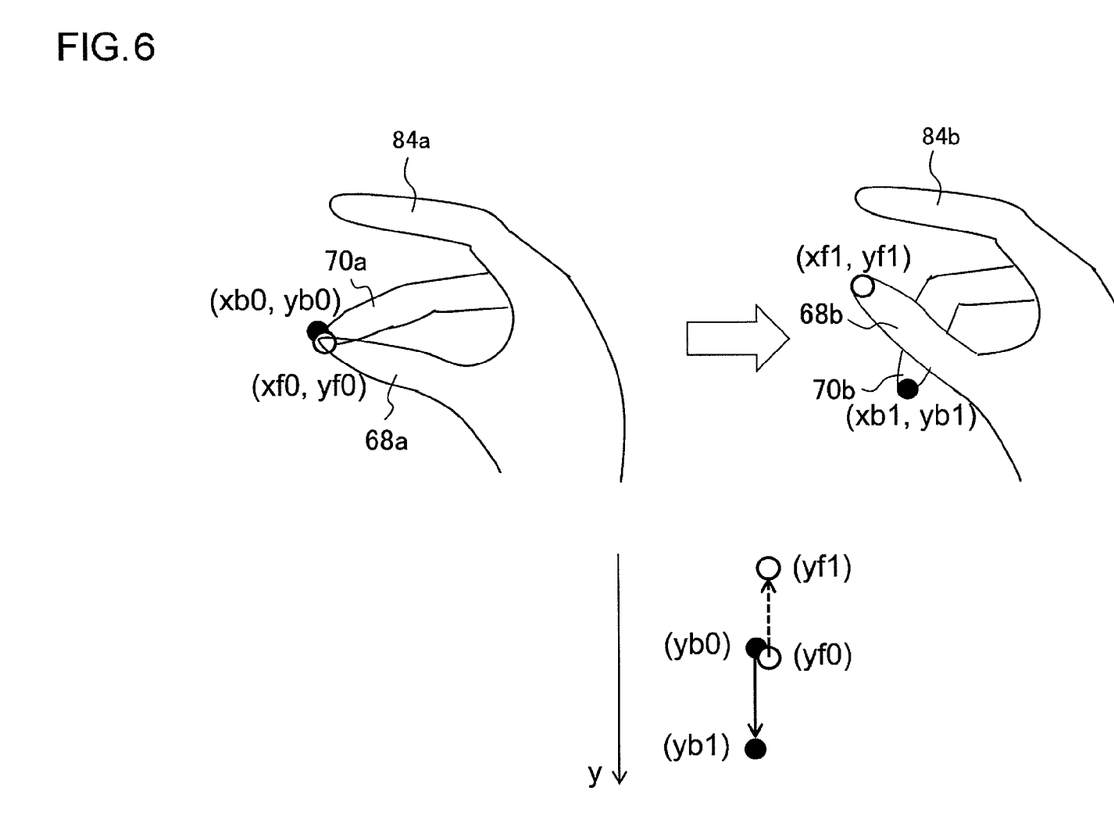
FIG. 6 shows an example in which the operation on the second touch pad is used in combination with the operation on the first touch pad.

Described above is an embodiment in which the operation using the middle finger on the second touch pad 16 on the rear face 10*c* of the information processing device is performed independently of the operation using the thumb or the index finger on the first touch pad on the front face 10*a*. Alternatively, a novel type of operation may be implemented by combining operations. FIG. 6 shows an example in which the operation using the middle finger on the second touch pad 16 is used in combination with the operation using the thumb on the first touch pad 12.

The top of the figure shows the middle finger and the thumb as they appear before and after the operation, and the bottom of the figure shows the movement of the y-coordinate component of the point of contact by each finger. For ease of understanding, the figure shows only the hand 84*a*, 84*b* as it appears before and after the operation. In practice, the main device body of the information processing device 10 will be located beneath the thumb and the index finger and the middle finger will be behind the device 10. The illustration shows an exemplary operation where the thumb and the middle finger are moved in opposite vertical directions so as to pass each other across the information processing device 10.

More specifically, the thumb 68*a* of the hand 84*a* in the initial state of operation touches first touch pad 12 at the coordinates (xf0, yf0), and the middle finger 70*a* touches the second touch pad 16 at the coordinates (xb0, yb0). The illustration shows the points of contact directly opposite to each other across the device, but the points of contact may be distanced. For example, the point of contact by the thumb 68*a* may be lower than the point of contact by the middle finger 70*a*. When the point of contact by the thumb 68*a* is moved upward and the point of contact by the middle finger 70*a* is moved downward in this state, the thumb 68*b* and the middle finger 70*b* cross each other as indicated by the hand 84*b* in the post-operation state.

It will be assumed that the coordinates of the point of contact by the thumb 68*b* are (xf1, yf1) and the coordinates of the point of contact by the middle finger 70*b* are (xb1, yb1). As described above, extracting only the vertical component of the movement of the points of contact by the respective fingers, the point of contact by the thumb (blank circle) is moved from yf0 to yf1 (yf0>yf1), and the point of contact by the middle finger (solid circle) is moved from yb0 to yb1 (yb0<yb1), as indicated at the bottom of the figure.

When the thumb and the middle finger are simultaneously moved in opposite directions on the same axis as described above, the display screen is scrolled in the direction of that axis at a speed higher than when it is scrolled only by using one of the fingers. Alternatively, the display area is jumped in the same direction to the end of the page being displayed. For example, a rule may be defined such that whether the positive or negative direction is chosen as a direction of scrolling or a jump is determined by the direction of movement of the thumb, and the rule is stored in the conversion rule storage unit 22. If the fingers are moved in directions opposite to those shown in the figure, the direction of scrolling or a jump is reversed.

The movement of the fingers shown in FIG. 6 is analogous to the movement of a finger physically pinching paper to feed or flip the paper. The operation as shown achieves a high-speed scroll or jump to the page end in an intuitive and natural motion. A horizontal scroll or jump can be effected similarly. As in the case of the isolated rear face operation as described above, whether to scroll the display screen only in the vertical axis direction or the horizontal axis direction may be defined by application software or user defined. In order to prevent a mistaken operation from occurring when the finger touches the pad inadvertently, a judgment may be made that an operation is performed only when predefined conditions established for the moving speed, acceleration, amount of movement of the points of contact by the fingers are met.

Further, an operation of mouse connected to a personal computer can be easily simulated by using the touch pads on the front face and the rear face, by mapping the left click of the mouse to the operation using the thumb or the index finger and mapping the movement of the mouse itself to the operation using the middle finger. For example, to implement the function of creating a document or table, a GUI that allows selection of an area within a document or table is displayed on the screen.

It may be ensured that, when the user scrolls the display screen with the middle finger on the second touch pad 16 while the area corresponding to the GUI on the first touch pad 12 remains touched by the thumb, the selection extends to the area that appears as a result of the scroll. As in the case described above, the operability will be improved by limiting the axis of scrolling as described above. Similarly, a keyboard operation may be simulated by mapping the role of a key (such as a shift key or a control key in a personal computer keyboard) designed to be pressed concurrently with another key to a rear face operation, and concurrently performing the rear face operation and a front face operation mapped to another key.

Figure 7:
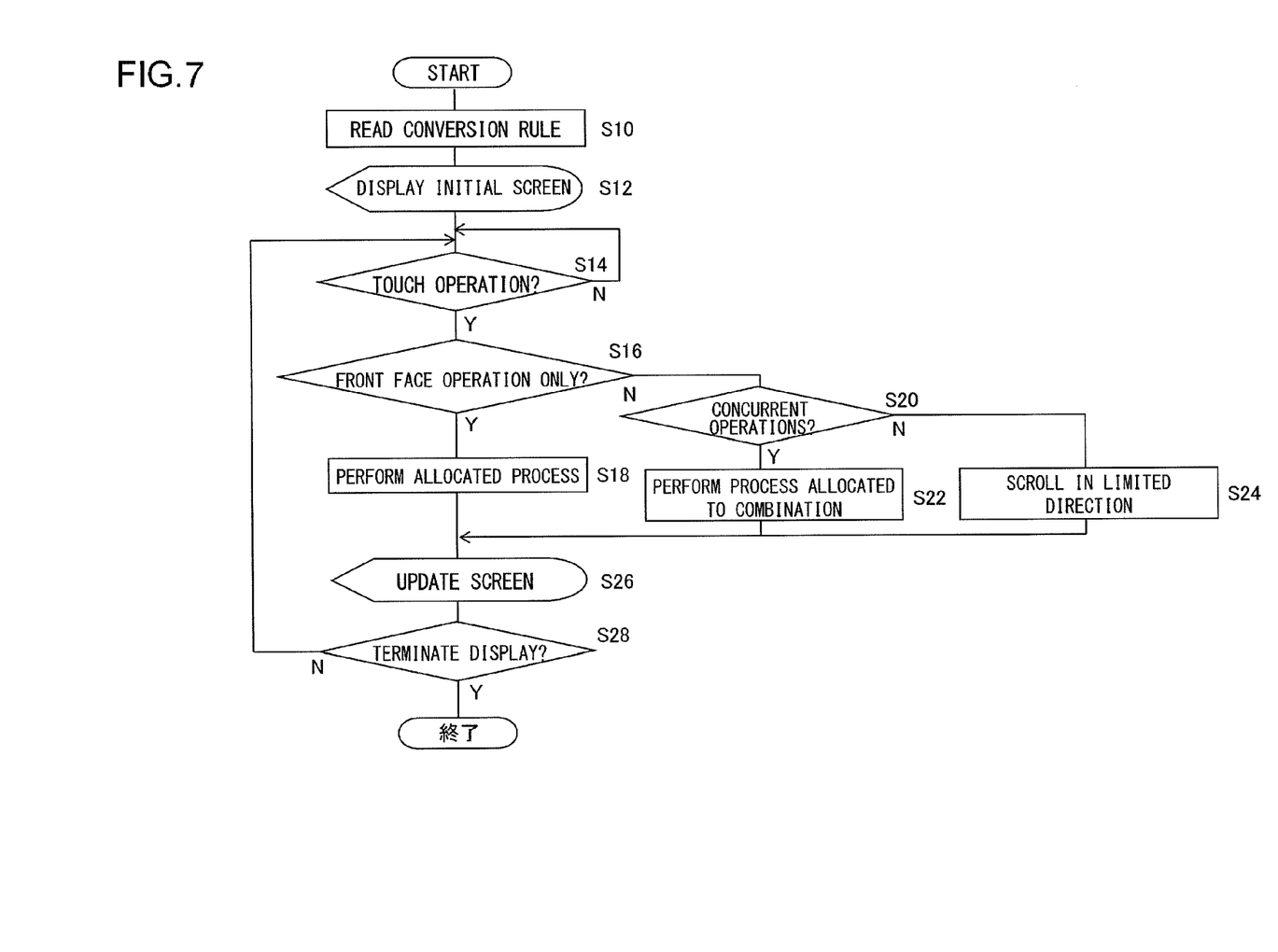
FIG. 7 is a flowchart showing the steps of a process of updating a displayed image performed by the information processing device in accordance with a touch operation by the user according to the embodiment.

A description will now be given of the operation of the information processing device 10 that can be implemented with the configuration described above. FIG. 7 is a flowchart showing the steps of a process of updating a displayed image performed by the information processing device 10 in accordance with a touch operation by the user. The process is started when, for example, the start switch 40 of the information processing device 10 is turned on. The user may further select one of a plurality of functions provided by the information processing device 10 or one of executable applications, or select a file of content or the like subject to processing. The figure shows the steps of the process related to a touch operation, but another process determined by a function implemented by the information processing device 10 may be performed in parallel.

Initially, the information processing unit 24 of the information processing device 10 loads into the conversion rule storage unit 22 a conversion rule defined in, for example, application software and adapted to convert the coordinates of the point of contact with the first touch pad 12 and the second touch pad 16 into the process that should be performed (S10). In this process, the information processing unit 24 may acquire data necessary for information processing from a server or an external storage device as needed and store the data in the content data storage unit 26. The information processing unit 24 displays an initial image determined by the function to be implemented on the display 14, controlling the image generation unit 28 and the input and output control unit 18 accordingly (S12).

Absent any touch operation by the user, the information processing unit 24 stands by in this state (N in S14). When the user touches at least one of the first touch pad 12 and second touch pad 16 (Y in S14), the control information conversion unit 20 receives an input signal related to the coordinates of the point of contact from the input and output control unit 18. When an operation is performed only on the first touch pad 12 provided on the front face 10*a* of the information processing device (Y in S16), the control information conversion unit 20 identifies the process mapped to the GUI corresponding to the point of contact or identifies the process allocated to the point of contact or the movement pattern thereof (e.g., free scroll or enlargement/reduction of the screen), based on the conversion rule. The control information conversion unit 20 informs the information processing unit 24 of the identified process so that the unit 24 executes the process (S18).

Meanwhile, when both the first touch pad 12 and the second touch pad 16 provided on the front face 10*a* and the rear face 10*c*, respectively, are operated simultaneously (N in S16, Y in S20), the process defined to correspond to the combination of the movements of the points of contact is identified, as exemplarily illustrated in FIG. 6. The information processing device 24 is informed of the identified process and executes the process (S22). When an operation is performed only on the second touch pad 16 provided on the rear face 10*c* of the information processing device (N in S20), only the component of the movement of the point of contact in the limited direction of axis is extracted so as to calculate the amount of scrolling. The information processing unit 24 is notified of the calculated amount and executes a scroll process accordingly (S24).

In any case of S18, S22, and S24, the displayed image on the display 14 is updated under the control of the input and output control unit 18 by using the image generation unit 28 to generate new image data as a result of information processing (S26). Absent a user input to demand termination of the display, the information processing device stands by for an operation on the touch pad (N in S28). When a touch operation is performed, associated information processing and display screen update are repeated (S14-S26). When a command to terminate the display is input, the process is terminated (Y in S28).

According to the embodiment described above, there is provided an information processing device such as a portable device designed to be held by a user for operation and comprising a display, wherein a touch pad is provided on the rear face of the information processing device opposite to the front face where a display is provided. As the point of contact by the finger on the rear face is moved, the component of the amount of movement in the predefined direction of axis is successively acquired and reflected in the scroll of the screen displayed on the display. This prevents scrolling in a direction unwanted by the user even if the operation is on the rear face, which is in an area blinded by the main device body. Therefore, the rear face can be effectively utilized to provide an input for user control in a natural movement.

By selectively or jointly using the operation on the touch pad provided on the display and the operation on the rear face, variation of inputs for user control can be increased even in a small-sized device with severe size constraints. By mapping the combination of the operation on the front face and the operation on the rear face to a process that should be performed, variation of inputs for user control can be dramatically increased.

Described above is an explanation based on an exemplary embodiment. The embodiment is intended to be illustrative only and it will be obvious to those skilled in the art that various modifications to constituting elements and combinations of processes could be developed and that such modifications are also within the scope of the present invention.

In the embodiment, only the front face of the information processing device 10 is provided with the display 14 covered by the first touch pad. Alternatively, the rear face may also be provided with a display and have the same configuration as the front face. In this case, an acceleration sensor (not shown) or the like may be provided in the information processing device so that the sensor may identify which face the user using the device is facing by referring to the movement of the information processing device, and define the identified face as the "front face". Alternatively, a camera (not shown) may be provided on the front face and the rear face so that the face faced by the user is determined by analyzing the captured image.

When a scroll operation is performed on the face corresponding to the "rear face" of the embodiment opposite to the face faced by the user, the direction of scrolling on the screen displayed on the "front face" is limited to a predetermined direction of axis. With this, the same advantage according to the embodiment as described above can be provided when displays are provided on both faces of the information processing device.

Figure 8:
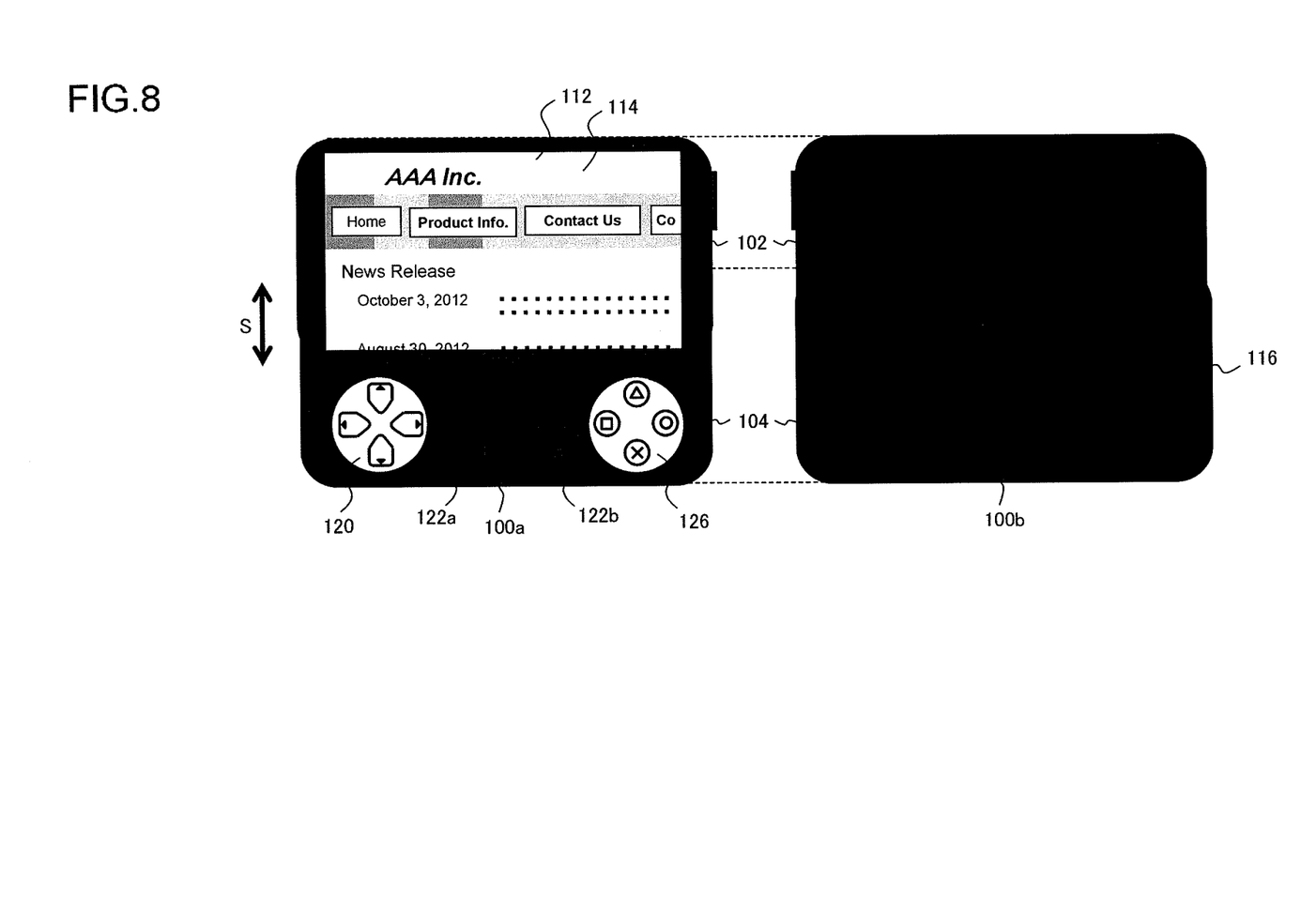
FIG. 8 shows an exemplary appearance of the information processing device according to the embodiment comprising a plurality of flat housings joined together.

The information processing device 10 according to the embodiment comprises a single flat housing. Alternatively, the information processing device may comprise a combination of a plurality of flat housings. FIG. 8 shows an exemplary appearance of the information processing device having the above-mentioned configuration. The left of the figure shows a front face 100*a* of the information processing device and the right of the figure shows a rear face 100*b* of the information processing device. The exemplary information processing device comprises an upper housing 102 provided with a display 114 and a lower housing 104 provided with various input buttons such that the housings are slidable in the direction indicated by the arrow S. The figure shows the lower housing 104 drawn. By sliding the lower housing 104 toward the upper housing 102, the lower housing can be accommodated behind the upper housing 102.

Like the information processing device 10 according to the embodiment, a first touch pad 112 covered by glass or a transparent resin is provided on the display 114. The lower housing 104 is provided with directional keys 120 that receive inputs in four directions, analog pads 122*a* and 122*b* that receive inputs in all directions depending on where the central pad is pressed, and four buttons that receive inputs allocated to the four buttons. The buttons provided on the lower housing 104 are not limited to those described above. Character input keys or numeral input keys may be provided.

In the case of the information processing device as described above, the rear face of the lower housing 104 is configured to comprise a second touch pad 116 covered with the same type of resin as that of the housing. With this configuration, an operation on the second touch pad 116 can be dealt with similarly as the operation on the second touch pad 16 according to the embodiment, irrespective of whether the lower housing 104 is drawn or not. This ensures that both the operation on the first touch pad 112 and the operation on the second touch pad 116 are always available for use and provides the same advantage as the embodiment as described above. The information processing device may be configured to be foldable by joining two housings by a hinge. A second touch pad may be provided on the rear face of the lower housing mainly held by the user.

A scroll operation on the display screen of the information processing device as configured above may be performed by using left and right analog pads 122*a* and 122*b*. The operation on the first touch pad and the operation on the second touch pad described in the embodiment may be mapped to the operation on the left analog pad 122*a* and the operation on the right analog pad 122*b*, respectively. In other words, the left analog pad 122*a* accepts a free scroll in all directions determined in accordance with the direction of the pressed point from the pad center. The right analog pad 122*b* receives the direction of the pressed point from the pad center and extracts only the component of the predefined direction of axis, accepting a scroll only in that direction of axis. With this, options of input means used to perform a scroll operation are increased so that the user can perform a desired operation in a desired method.

What is claimed is:

1. An information processing device provided with a display on a front face of a main device body, comprising:
    a rear face touch pad provided on a rear face of the main device body and configured to detect a position of contact by a user as a point of contact;
    a control information conversion unit configured to convert information indicating the point of contact detected on the rear face touch pad into information indicating a process that should be performed, in accordance with a predefined conversion rule; and
    an information processing unit configured to execute the process that should be performed and to update a display screen on the display,
    wherein, when the point of contact is moved while contact is maintained, the control information conversion unit calculates a directional component of the amount of movement along a predefined direction of an axis and converts the information whereby the display screen is scrolled only in a predetermined direction of the axis by the amount of movement corresponding to the calculated directional component, and
    wherein the control information conversion unit switches the predetermined direction of the axis by determining which of a predefined range of angles an angle of an initial direction of movement of the point of contact belongs to.

2. The information processing device according to claim 1, further comprising:
    a front face touch pad provided to cover the display and configured to detect a position of contact by the user as a point of contact,
    wherein the control information conversion unit converts a combination of the information on the point of contact detected by the rear face touch pad with information on a point of contact detected by the front face touch pad into the information on the process that should be performed, in accordance with the conversion rule.

3. The information processing device according to claim 2, wherein, when points of contact are moved in opposite directions along the predefined direction of the axis while contact with the rear face touch pad and the contact with the front face touch pad are both maintained, the control information conversion unit moves the display screen to the end of a page subject to display in the predefined direction of the axis.

4. The information processing device according to claim 1, wherein, the control information conversion unit calculates a directional component of the amount of movement along a diagonal axis direction at a predetermined angle on a screen plane, and converts the information whereby the display screen is scrolled only in the diagonal axis direction.

5. The information processing device according to claim 1, wherein, the display is provided on each face of the main device body, each display being covered by a touch pad, the information processing device further comprises a sensor configured to identify which face a user is facing, and the control information conversion unit determines that a touch pad provided on a face the user is not facing is the rear face touch pad.

6. An information processing method configured to cause an information processing device provided with a display on a front face of a main device body to perform the steps of:
    detecting a position of contact by a user with a rear face touch pad provided on a rear face of the main device body, as a point of contact;
    converting information indicating the detected point of contact into information indicating a process that should be performed, in accordance with a predefined conversion rule; and
    executing the process that should be performed and updating a display screen on the display,
    wherein, when the point of contact is moved while contact is maintained, the step of converting also includes calculating a directional component of the amount of movement along a predefined direction of an axis and converting the information whereby the display screen is scrolled only in a predetermined direction of the axis by the amount of movement corresponding to the calculated directional component, and
    wherein the predetermined direction of the axis is switched by determining which of a predefined range of angles an angle of an initial direction of movement of the point of contact belongs to.

7. A computer program embedded in a non-transitory computer readable recording medium, configured to cause a computer provided with a display on a front face of a main device body to implement the modules of:
    detecting a position of contact by a user with a rear face touch pad provided on a rear face of the main device body, as a point of contact;
    converting information indicating the detected point of contact into information indicating a process that should be performed, in accordance with a predefined conversion rule; and
    executing the process that should be performed and updating a display screen on the display,
    wherein, when the point of contact is moved while contact is maintained, the module for converting the information further calculates a directional component of the amount of movement along a predefined direction of an axis and further converts the information whereby the display screen is scrolled only in a predetermined direction of the axis by the amount of movement corresponding to the calculated directional component, and
    wherein the predetermined direction of the axis is switched by determining which of a predefined range of angles an angle of an initial direction of movement of the point of contact belongs to.

8. A non-transitory computer-readable recording medium having embedded thereon a computer program configured to cause a computer provided with a display on a front face of a main device body to implement the modules of:
    detecting a position of contact by a user with a rear face touch pad provided on a rear face of the main device body, as a point of contact;

converting information indicating the detected point of contact into information indicating a process that should be performed, in accordance with a predefined conversion rule; and executing the process that should be performed and updating a display screen on the display, wherein, when the point of contact is moved while contact is maintained, the module for converting the information further calculates a directional component of the amount of movement along a predefined direction of an axis and further converts the information whereby the display screen is scrolled only in the predetermined direction of the axis by the amount of movement corresponding to the calculated directional component, and wherein the predetermined direction of the axis is switched by determining which of a predefined range of angles an angle of an initial direction of movement of the point of contact belongs to.

* * * * *